United States Patent
Bergstrom et al.

(10) Patent No.: US 7,327,777 B2
(45) Date of Patent: Feb. 5, 2008

(54) METHOD AND APPARATUS FOR DISTRIBUTED POLYPHASE SPREAD SPECTRUM COMMUNICATIONS

(75) Inventors: Chad Scott Bergstrom, Chandler, AZ (US); Jeffery Scott Chuprun, Scottsdale, AZ (US); Steve Arneson, Mesa, AZ (US); Hugh Robert Malone, Phoenix, AZ (US)

(73) Assignee: General Dynamics Corporation, Scottsdale, AZ (US)

( * ) Notice: Subject to any disclaimer, the term of this patent is extended or adjusted under 35 U.S.C. 154(b) by 663 days.

(21) Appl. No.: 10/871,442

(22) Filed: Jun. 17, 2004

(65) Prior Publication Data

US 2005/0281321 A1  Dec. 22, 2005

(51) Int. Cl.
  *H04B 1/00* (2006.01)
(52) U.S. Cl. .................................................. 375/140
(58) Field of Classification Search ................ 375/130, 375/140, 146, 147, 152, 346
  See application file for complete search history.

(56) References Cited

U.S. PATENT DOCUMENTS

| | | | |
|---|---|---|---|
| 5,959,966 A | | 9/1999 | Torkkola |
| 6,141,372 A | * | 10/2000 | Chalmers ...................... 375/147 |
| 6,240,282 B1 | | 5/2001 | Kleider et al. |
| 6,426,983 B1 | * | 7/2002 | Rakib et al. ................. 375/346 |
| 6,480,535 B1 | * | 11/2002 | Witmayer .................... 375/232 |
| 6,867,727 B1 | * | 3/2005 | Mitra ............................ 342/59 |
| 2004/0152418 A1 | * | 8/2004 | Sinha et al. ................... 455/42 |
| 2005/0276335 A1 | * | 12/2005 | Kumar ......................... 375/260 |

OTHER PUBLICATIONS

Akhilesh Jha, Efstratios Nikolaidis, Sathya Gangadharan, *Vibration of Dynamic Systems Under Cyclostationary Excitations*, 13th ASCE Engineering Mechanics Division Conference, 1999, Baltimore Maryland, 18 pages, Virginia Polytechnic Institute and State University, Blacksburg, VA.

(Continued)

*Primary Examiner*—Emmanuel Bayard
(74) *Attorney, Agent, or Firm*—Ingrassia Fisher & Lorenz, P.C.

(57) ABSTRACT

Methods and apparatus are provided for distributed polyphase spread spectrum communication and non-contiguous spectrum underlay. The method includes polyphase channelizing a direct sequence spread spectrum (DSSS) signal, determining available spectrum in an observed frequency range having a noise floor based on detection of polyphase users below the noise floor, distributing the polyphase channelized signal among the available spectrum, and interference mitigation using a combination of standard signal detection and cyclostationary feature detection methods. The apparatus includes: a first processor adapted to polyphase channelize a code division multiple access (CDMA) spectrum and a digitized RF bandwidth containing a discontiguous polyphase waveform distribution; a second processor adapted to detect occupied bands, interferers and polyphase users in a spectrum and determine discontiguous frequency opportunities based on the detected interferers and polyphase users; and a third processor adapted to allocate the polyphase channelized CDMA spectrum among available spectrum based on the discontiguous frequency opportunities.

32 Claims, 7 Drawing Sheets

OTHER PUBLICATIONS

A. J. Weiss, B. Friedlander, *Simultaneous Signals in IFM Receivers*, IEE Proc.—Radar, Sonar Navig., Aug. 1997, p. 181-185, vol. 144, No. 4.

D. Yellin, B. Friedlander, *A Maximum Likelihood Approach to Blind Separation of Narrowband Digital Communication Signals*, IEEE, 1997, pp. 679-683, University of California, Davis, CA.

Kari Torkkola, *Blind Signal Separation in Communications: Making Use of Known Signal Distributions*, IEEE DSP Workshop, Bryce Canyon, UT, Aug. 1998, Motorola, Phoenix Corporate Research Labs, AZ.

CECOM, Research, Development and Engineering Center, *Master List of Technology Needs*, Jan. 2002, p. 1-19, Fort Monmouth, NJ.

* cited by examiner

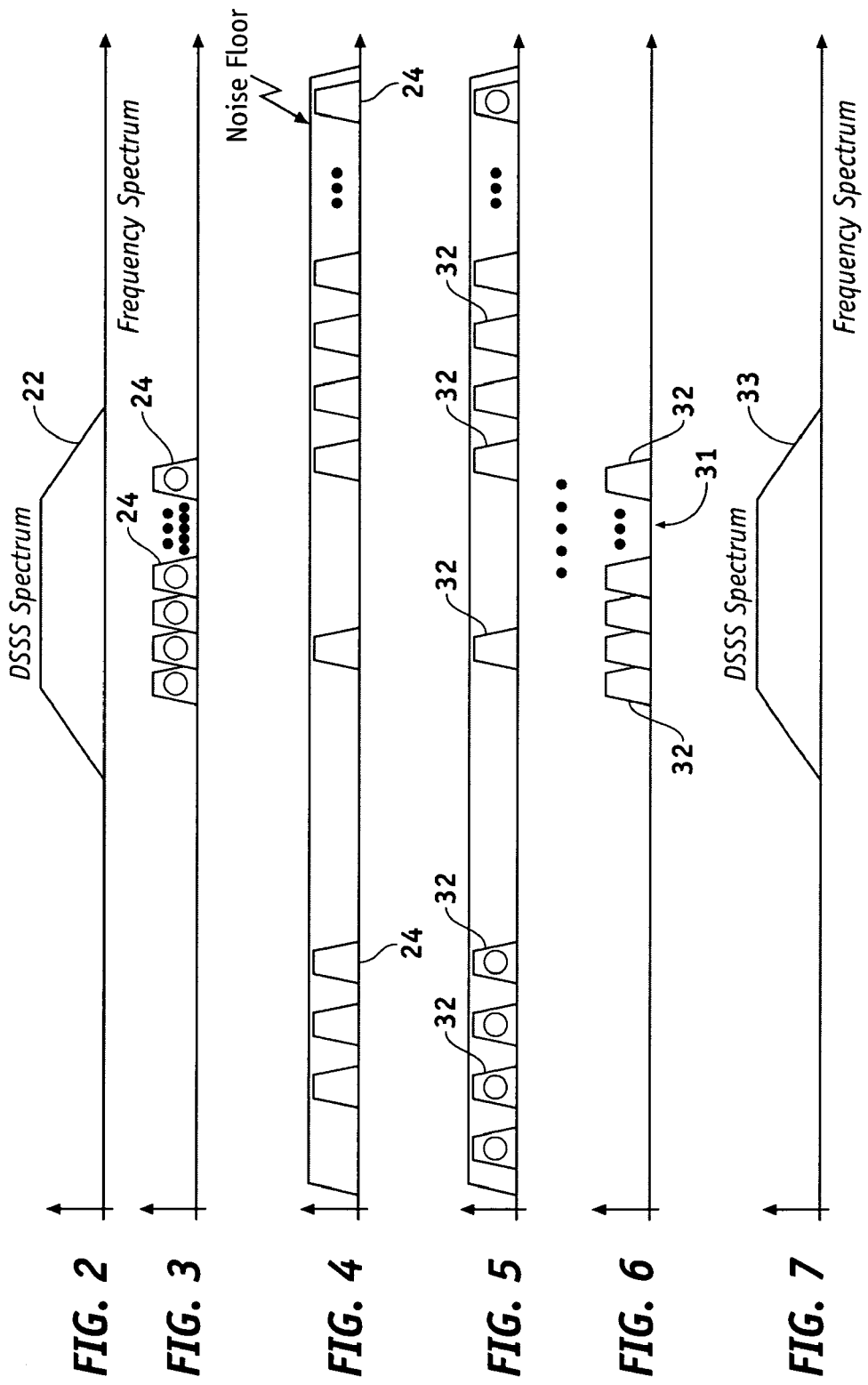

METHOD AND APPARATUS FOR DISTRIBUTED POLYPHASE SPREAD SPECTRUM COMMUNICATIONS

FIELD OF THE INVENTION

The present invention generally relates to spread spectrum communication, and more particularly relates to direct sequence spread spectrum communication using polyphase channelization and non-contiguous spectrum underlay.

BACKGROUND OF THE INVENTION

Radio frequency (RF) spectrum is a scarce resource. In cellular or personal communications systems environment, an increasing number of users need to be simultaneously serviced while also attempting to avoid interference among such users. One way to increase the number of simultaneous users on a given frequency band is code division multiple access (CDMA). CDMA refers to a form of multiplexing which allows numerous signals to occupy a single transmission channel thereby optimizing the use of available bandwidth. The term CDMA is sometimes more generally referred to as direct sequence (DS) pseudo-noise (PN) modulation, or DSPN. The term "direct sequence spread spectrum" (DSSS) may also be used. For convenience of simplified explanation, the terms CDMA, DSPN, and DSSS are interchangeably used herein. This technology is generally used in ultra-high-frequency (UHF) cellular telephone systems in the 800-MHz and 1.9-GHz bands.

CDMA employs analog-to-digital conversion (ADC) in combination with spread spectrum signal processing. Input data is first digitized for transmission, and the transmitted signal is then made to vary according to a defined pattern or code. CDMA signals can generally be intercepted by a receiver that is programmed with the same code as the transmitted signal so that such receiver follows the transmitter code. Spread-spectrum modes support several times as many signals per unit bandwidth as typically found in analog modes.

In multi-code (MC) CDMA radio telephone systems, several CDMA signals associated with a single user may be sent between two stations in order to provide the user with a higher data rate. In such systems, each CDMA signal associated with a single user may be spread using orthogonal Walsh codes. However, the transmission quality of the CDMA signals in such systems typically degrades when the signals travel over more than one, path between the transmitter and the receiver. This is because such "multi-path propagation" causes co-channel interference between the transmitted CDMA signals. Multiuser communications systems that employ CDMA exhibit a limit on the number of users that can simultaneously communicate over a channel and maintain a specified level of performance per user. This limitation is caused by the domination by other user interference over the additive thermal noise.

The CDMA codes are generated by, e.g., Walsh functions that mathematically form an orthogonal set. Thus, any two Walsh functions are orthogonal to each other, and signals encoded with two separate Walsh functions should cause no mutual interference when they are time aligned. However, because multiple signals often are not time aligned, complete orthogonality is not achieved in practice. As a result, interference between otherwise orthogonal signals occurs. This is known as multiple access interference (MAI).

CDMA/DSPN communications generally involve a use of wider bandwidths than other forms of communications. Because the spectrum is generally a finite resource, increasing signal clutter makes finding large contiguous portions of spectrum available for wide bandwidth signals difficult. Furthermore, an allocation of communication system bandwidth generally results in an inefficient use of the spectrum, with guard bands and spectrum gaps that may otherwise be used for data transmission.

In view of the foregoing, it is desirable to provide spread spectrum communication that allows for efficient and greater spectrum aggregation and management. In addition, it is desirable to provide spread spectrum communication having interference mitigation that allows for an "underlay" communications network to effectively coexist in a non-contiguous fashion with an existing legacy communications network without materially interfering with performance. Furthermore, other desirable features and characteristics of the present invention will become apparent from the subsequent detailed description and the appended claims, taken in conjunction with the accompanying drawings and this background of the invention.

BRIEF SUMMARY

A method of communication is provided for a direct sequence spread spectrum (DSSS) signal having the steps of polyphase channelizing the DSSS signal, determining available spectrum in an observed frequency range having a noise floor based on detection of polyphase users below the noise floor, and discontiguously distributing the polyphase channelized signal among the available spectrum. The method may further include transmitting the discontiguous distributed signal, receiving the transmitted signal, and reconstructing the original DSSS signal from the discontiguous distributed signal using near-perfect reconstruction methods. The method may further include discontiguous polyphase channel sounding to equalize the distributed DSSS signal. The method may further include directing the receiver toward the spectrum allocation that is to be used using a distributed spectrum access control signal, and the polyphase channelization may then be adapted by the receiver based on the control signal. Alternatively, a discontiguous transmit allocation may be autonomously detected by the receiver.

An apparatus is also provided for spread spectrum communication. The apparatus includes a first processor adapted to polyphase channelize a code division multiple access (CDMA) spectrum and a digitized RF bandwidth containing a discontiguous polyphase waveform distribution, a second processor adapted to detect occupied bands, interferers and polyphase users in a spectrum and determine discontiguous frequency opportunities based on the detected interferer and polyphase users, and a third processor adapted to allocate available spectrum based on the discontiguous frequency opportunities. The apparatus may further include a receiver that substantially reverses the order of signal processing steps to reconstruct the original CDMA signal.

BRIEF DESCRIPTION OF THE DRAWINGS

The present invention will hereinafter be described in conjunction with the following drawing figures, wherein like numerals denote like elements.

FIGS. 2-7 are graphs illustrating discontiguous polyphase waveform construction;

DETAILED DESCRIPTION

The following detailed description of the invention is merely exemplary in nature and is not intended to limit the invention or the application and uses of the invention. Furthermore, there is no intention to be bound by any theory presented in the preceding background of the invention or the following detailed description of the drawings.

Although a spread spectrum radio is described hereinafter with regard to corresponding hardware that accomplishes signal processing functions, the spread spectrum radio may alternatively utilize software, such as found in software defined radios, that encompass applications, routines, or other software modules to accomplish signal processing functions. Those of skill in the relevant art will appreciate that other variations of hardware, software, or any combination thereof may be implemented to accomplish the same functions such as programmable microprocessors, field programmable gate arrays (FPGAs), or controllers.

Figure 1:
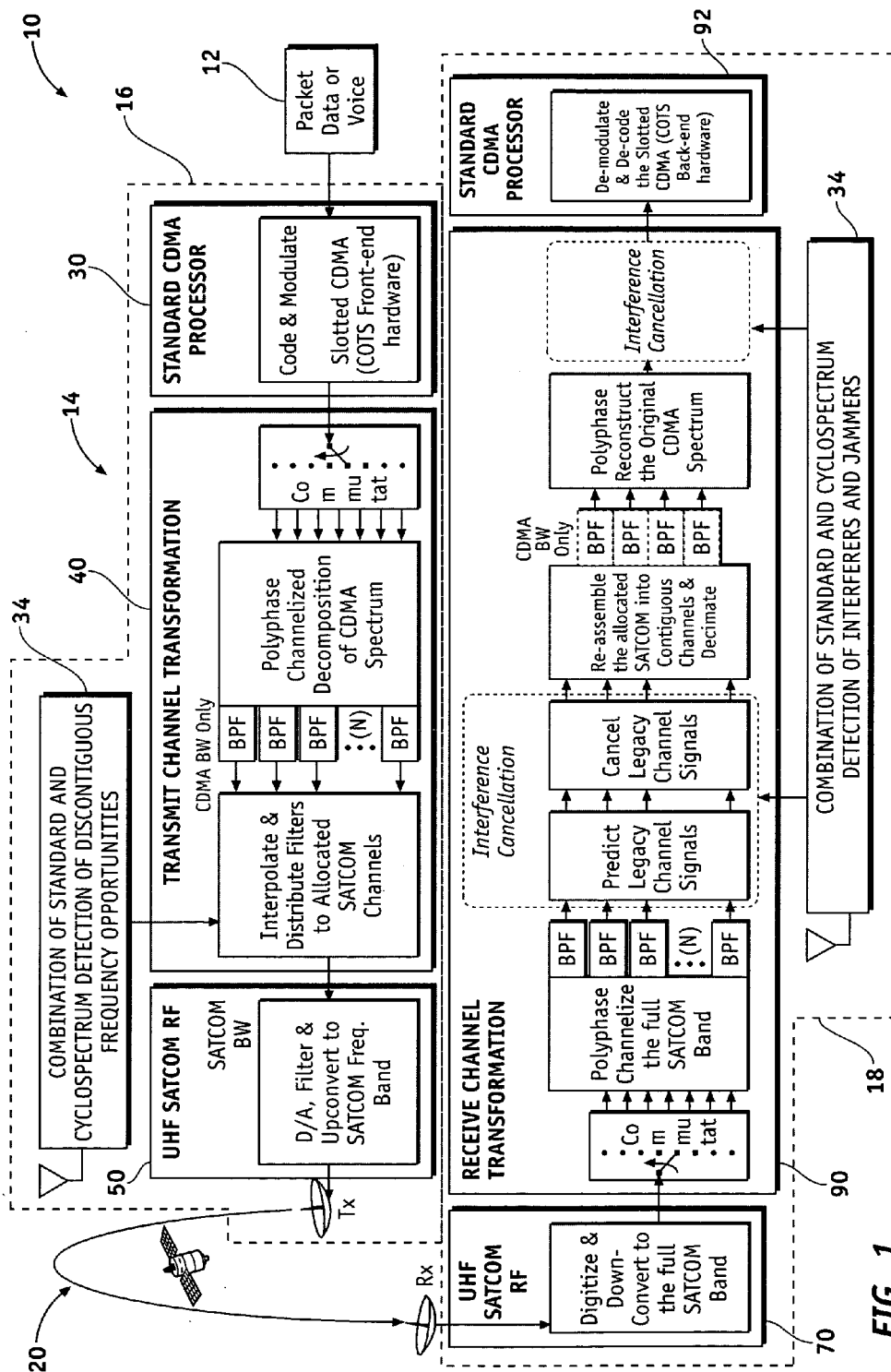
FIG. 1 is a block diagram illustrating a spread spectrum radio.

Referring to the drawings, FIG. 1 is a block diagram illustrating a communications system 10 in accordance with one embodiment of the present invention. It should be appreciated that the blocks of FIG. 1 (as well as the blocks in the other block diagrams disclosed herein) represent functional elements and are not intended to represent discrete hardware elements. For example, in one embodiment of the invention, many of the functions illustrated in FIG. 1 are implemented in a single processor unit. As previously mentioned hereinabove, the functions can all be implemented in hardware, all in software, or a combination of hardware and software can be used.

As shown in FIG. 1, the communications system 10 includes a data source 12, a spread spectrum radio, shown generally at 14, having a transmitter 16 and a receiver 18, and optionally a transponder, shown generally at 20. Although the spread spectrum radio 14 is shown to include both the transmitter 16 and receiver 18, the transmitter 16 and receiver 18 may be separate and individual components in the system 10. The data source 12 delivers a data signal to the transmitter 14 that processes the data and creates a transmit signal. The receiver 18 receives transmitted signals and processes the signal to recover original data contained in the receive signal.

The transmitter 16 includes a modulation/coding unit 30 that prepares a spread signal from data received from the data source 12 and a transmit channel transformation processor 40 that decomposes the spread signal using polyphase channelization. The modulation/coding unit 30 applies modulation and/or coding to the data as is familiar to those of skill in the art. For example, the modulation/coding unit 30 can apply source coding, channel coding, interleaving, and/or various forms of modulation to a data signal. In a spread spectrum system, the modulation/coding unit 30 applies signal spreading to the signal using methods that are well known in the art, such as direct sequence and frequency hopping.

FIGS. 2-7 are graphs illustrating discontiguous polyphase waveform construction. FIG. 2 is a graph showing a continuous spectrum of a DSSS-CDMA spread signal 22. In one embodiment, the modulation/coding unit 30 is a CDMA processor that codes and modulates packet data or voice signals to provide a continuous spectrum of a DSSS-CDMA spread signal having baseband data coding and DSSS modulation coding. An observed frequency range is determined by standard and cyclostationary detection of interferers and other spread spectrum users below a noise floor as will be discussed in greater detail hereinbelow. The bandwidth and chipping rate of the spread signal are scaled to match an aggregate bandwidth of a total number of channels available within the observed frequency range. Using time slotted CDMA, the number of users may be multiplied at a cost of a lower data rate for each user.

FIG. 3 is a graph showing polyphase channelization of the continuous spectrum of the DSSS-CDMA spread signal. The transmit channel transformation processor 40 receives the CDMA spread signal and polyphase channelizes the continuous spectrum of the spread signal into respective channels 24. In one embodiment, a programmable and reversible polyphase channelization process is performed by the transmit channel transformation processor 40. Filter bandwidths of the transmit channel transformation processor 40 are selected such that a group of channelizer filters fit within an available channel width, where the available channel is determined by spectrum observations. Any combination of "N" channelizer filters that fit within one of the available channels is selectable. Bandpass filters are used during decomposition of the spread signal by polyphase channelization. The combination of discontiguous polyphase channelization and distribution of a DSSS signal provides a low-probability of intercept/low probability of detection (LPI/LPD) waveform.

FIG. 4 is a graph showing channels 24 distributed to fit available observed RF spectrum. Once the CDMA spectrum is channelized, each of the channelizer filters are distributed or allocated into any available or usable spectrum and in any order or discontiguously. Determination of available channel width and usable spectrum is based on the detected occupied bands and other polyphase users below a noise floor using a combination of standard signal detection and cyclostationary feature detection. For example, an occupied band is scanned, such as by a processor operating a spectrum awareness algorithm, and decomposed into signal types, bandwidths, and center frequencies to determine opportunities of usable spectrum. Although some standard signal detection techniques reveal occupied bands above a noise floor, the availability of spectrum below the noise floor is unknown using those standard detection techniques. Cyclostationary feature detection assists in identifying other polyphase users below the noise floor. Samples from each of the channelizer filters are digitally translated to a desired channel position based on the detected occupied bands and other polyphase users below the noise floor. Based upon spectrum observations, a power level, or ratio, is determined in each channel, and a choice of channels for CDMA operation is allocated. To improve capacity, the receiver 16 (FIG. 1) can feed back a measure of a ratio of legacy power to CDMA power received in each of the occupied channels corresponding to the received signal. In this embodiment, each of the CDMA channels performs a power ratio measurement on each respective CDMA channel. From the number of CDMA channels authorized and a required dB-down ratio, a maximum level of composite CDMA channel interference to a legacy channel is controlled with active feedback.

After channel distribution, the signal is up-converted for RF transmission and the full desired band is down-converted for signal reception and processing. Both up-conversion and down-conversion are described in greater detail hereinbelow. Returning to FIG. 1, the receiver 18 includes a receive channel transformation processor 90 having a demodulation/decoding unit 92 and an interference processor 34 that conducts interference cancellation described in greater detail hereinbelow. FIG. 5 is a graph illustrating channelization of a reused band. The fully digitized RF bandwidth provided by the down-converter 70 (FIG. 1) is polyphase channelized by the receive channel transformation processor 90 (FIG. 1) into respective channels 32. Digital filtering is similar to channelizing the original CDMA channel spectrum after sample rate interpolation in the transmit channel transformation processor 40. Each of the receive channelization filters is structurally similar to the original CDMA channelization filters previously discussed hereinabove with respect to transmit channel transformation. For example, a programmable polyphase channelization process is performed by the receive channel transformation processor 90. Bandpass filters are used during decomposition of the digitized and down-converted RF bandwidth signal by polyphase channelization. Extraneous spectral inputs from known gaps between channels may be zeroed as a part of a spectrum normalization process for mitigating interference. The original transmitted CDMA spectrum can be reconstructed in a reverse order compared to fabrication as previously discussed with respect to transmit channel transformation. The reconstruction process may employ methods known to those of skill in the art that provide for near-perfect signal reconstruction.

FIG. 6 is a graph illustrating re-assembly of distributed channels into a single channel with reconstruction. FIG. 7 is a graph illustrating a reconstructed DSSS after equalization and interference cancellation. In one embodiment, after interference cancellation is performed on the channelized signal, the CDMA channelized filters are re-assembled, or translated, to the order found after polyphase channelization of the original continuous transmitter CDMA spectrum. The resulting spectrum and sample rate drops from the total band to the nominal bandwidth of the CDMA signaling spectrum. Polyphase reconstruction of the original baseband CDMA spectrum is then performed to allow for a subsequent standardized CDMA process. Although CDMA process is discussed, the choice of signaling options for subsequent standardized backend processor extends beyond the use of direct sequence CDMA, to for example, "featureless" waveforms. The spectrum for this featureless LPD waveform could be aggregated from a number of disjoint spectral resources that may be underutilized, and presented to a desired waveform processor as a continuous spectrum. The channel transformation process and RF conversion process could manage and assemble the required spectrum with minimal impact to such waveform processor.

In one embodiment, the demodulation/decoding unit 92 performs a standardized DSSS or CDMA baseband process. This process may be a combined time domain multiplexing (TDM) CDMA structure that enables multiple polyphase users to contend for the channel. In this embodiment, a repeating time frame is divided by a number of assignable time slots to multiply the total number users possible at lower data rate. Higher rate users are given multiple slots commensurate with respective data rate needs.

Figure 8:
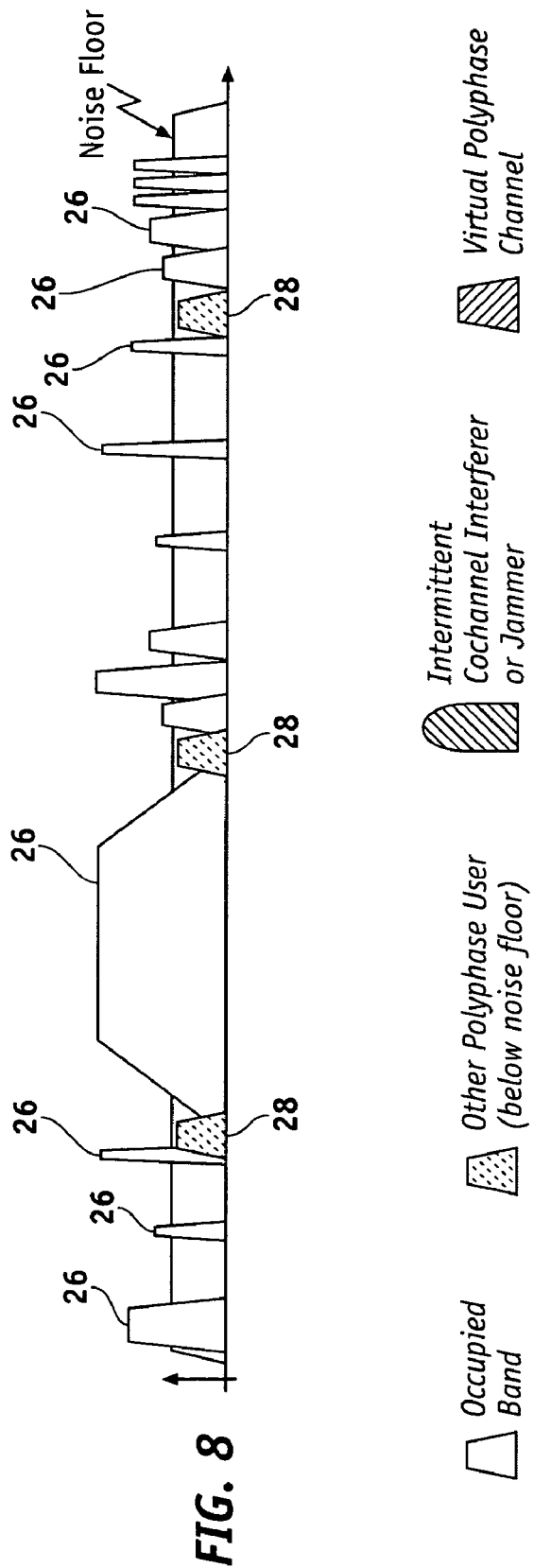
FIG. 8 is a graph illustrating an observed radio frequency (RF) spectrum having occupied bands and other polyphase users.
Figure 9:
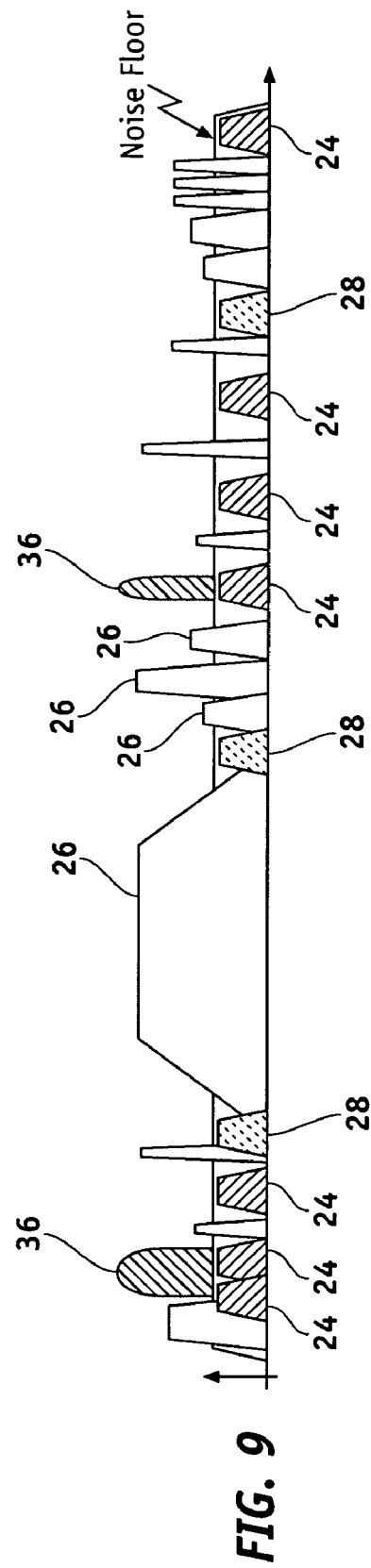
FIG. 9 is a graph illustrating a composite spectrum having the allocated channels among occupied bands, other polyphase users and interferers occupying the observed RF spectrum shown in FIG. 8.

FIG. 8 is a graph illustrating an observed radio frequency (RF) spectrum having occupied bands 26 and other polyphase users 28. FIG. 9 is a graph illustrating a composite spectrum having the allocated channels 24 among occupied bands, other polyphase users and interferers occupying the observed RF spectrum shown in FIG. 8. As best shown from FIGS. 8 and 9, this channel allocation contributes to efficient co-use of the observed occupied spectrum below the noise floor and reduction of co-channel effects. Additionally, this channel allocation based on determination of available spectrum in the observed RF spectrum assists in re-use of existing transponder resources. For example, in satellite systems with fixed allocation of transponder channels, a direct sequence waveform may be broken-up to fit such transponder channels, allocated to the exact location of such transponder channels, and used as a form of communication relay to enable operation under other satellite channel users. In cases of operating with satellite transponders, zero memory non-linearity (ZMNL) are constraints imposed by satellite transponders that create a type of front-end distortion to protect receivers. The invention described herein, including the application of active interference mitigation techniques, is effective in the presence of such ZMNL constraints.

Returning to FIG. 9, other polyphase users 28 and intermittent co-channel interferers 36 or jammers are detected among the composite spectrum. Detection, demodulation, and interference mitigation of legacy signal interference or other intermittent sub-band interferers may be conducted prior to re-assembling the CDMA channelization filters or after polyphase reconstruction of the original CDMA spectrum. During interference cancellation, the receive channel transformation processor 90 predicts legacy channel signals and then cancels legacy channel signals. Interference channel signal strength is measured to provide signal power ratio feedback data to the CDMA transmitter 16. Depending on the type of interference cancellation technique used, the specific set of functions is variable. Doppler tracking and channel equalization are optionally performed by the interference processor 34 depending on the selected type of interference cancellation. The interference processor 34 removes a high level of interference from simultaneous legacy signaling to improve CDMA signaling signal-to-noise ratio (SNR) margin and to allow a maximum number of simultaneous CDMA users.

A variety of interference mitigation methods may be performed by the interference processor 34 including but not limited to: interference prediction with inverse filtering of the interference; spectral self-normalization to suppress interfering spectral peaks; adaptive weighting; and, decision directed feedback cancellation. In decision directed feedback cancellation, legacy signals within each channel are demodulated to identify and separate each signal, then re-modulated and inverse equalized out of phase with a stored receive signal to cancel them from the CDMA channel process. Cyclostationary feature detection is conducted by the interference processor 34 to extract interferer features prior to cancellation, and based on the type of detected interferer, the appropriate interference mitigation method is applied.

Because the techniques used by the interference processor 34 to conduct detection, demodulation, and interference mitigation are also useful to detect frequency opportunities, the interference processor 34 may also conduct detection of frequency opportunities as previously mentioned hereinabove regarding transmit channel transformation. Alternatively, a separate processor may be used to conduct detection of frequency opportunities in the observed RF spectrum using standard signal detection and cyclostationary feature detection.

Using the interference mitigation discussed hereinabove, underlaying of spread spectrum signals into various bands across the spectrum can be achieved by operating directly in-band with legacy communications or by operating in the noise floor adjacent to legacy communications using underused portions of the spectrum.

Figure 10:
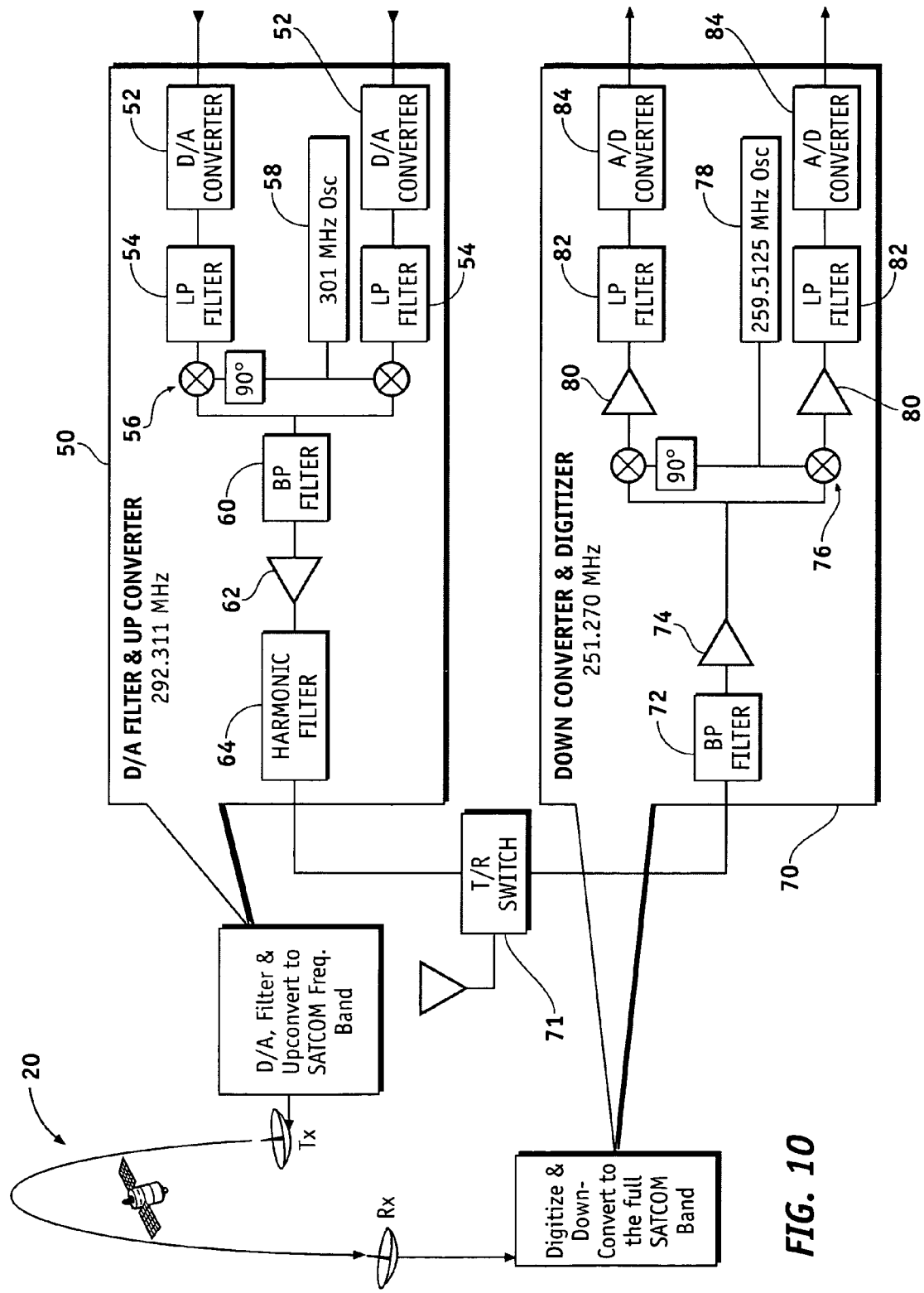
FIG. 10 is a block diagram illustrating an up-and-down converter with optional transponder component.

FIG. 10 is a block diagram of an up-and-down converter with optional transponder component. In this embodiment, the spread spectrum radio 14 includes a combination up-and-down converter, shown generally at 44, with a transmit/receive (T/R) switch 46 and optional transponder 20. Although the RF architecture shows a combination up-and-down converter 44, a separate up-converter may be used to operate independently and stand-alone from a separate down-converter. For example, the transmitter 16 may include an up-converter processor, and the receiver 18 may include a down-converter processor. Additionally, other variations and different embodiments of RF architecture may also be selected for up-and-down conversion.

An up-converter processor 50, or up-converter, conditions the distributed signal from the transmit channel transformation processor 40 for RF transmission. The up-converter 50 includes digital-to-analog (D/A) converters 52, or DACs, that each converts the digital transmit data to the RF transmit signal. A down-converter processor 70, or down-converter, converts RF received signals to digital information and subsequent processing by a receive channel transformation processor 32 described in greater detail hereinbelow. Although two separate processors are described with regard to up-conversion and down-conversion, a common processor may be used to accomplish up-and-down conversion.

The up-converter 50 receives the digital data after channel allocation and first converts the digital data to an analog baseband signal. This analog signal contains each of the channels spaced over the available spectrum. For more accurate analog signal generation, the DAC required for this conversion should provide a minimum of 12-bit resolution. One DAC model for use with this application is an Analog Devices AD9764 type. This DAC model is a 14-bit device with an update rate of 125 Msps and a power dissipation of 170 mW. Other specific DACs with different sample rates, number of bits, and power dissipations may also be used. A pair of DACs may be used to generate in-phase and quadrature-phase (I&Q) signals that are up-converted to desired transmit channel frequencies. The output of each DAC 52 is fed through a low pass filter 54 to remove all D/A harmonics outside of the transmit band. The signal is then passed through amplification, not shown, to a desired value for up-converting mixing. The peak value of the composite signal is generally several dB higher than the average value. In this example, an actual peak-to-average ratio of about a 6 dB is expected. To tolerate this peak-to-average ratio, the average level into mixing should be about 6 dB below an allowable level for a non-peaking signal. In this example, a gain compression of about 0.2 dB generally will not adversely impact a non-peaking signal. Other peak-to-average ratios are also appropriate for this application.

A doubly-balanced mixer, shown generally at 56, such as a Mini-circuits JMS-1 MH, may be used as a frequency conversion element. This mixer generally requires a local oscillator (LO) power of +13 dBm. A 1 dB gain compression point is approximately +8 dBm, and a 0.2 dB gain compression point is approximately +5 dBm. To tolerate the 6 dB peak-to-average ratio in this example, the average input power to the mixer 56 is about −1 dBm. The conversion loss of this mixer is typically less than 6 dB, and the average output signal is approximately −7 dBm. The JMS-1 MH mixer typically provides 60 dB of isolation between an LO port and an RF port. At an LO power of +13 dBm, the LO leakage from the RF port is approximately −47 dBm at 301 MHz. At −47 dBm, the level of the radiated energy at LO frequency is 40 dB below the total signal power and approximately 25 dB below the power in any one of the transmitted channels. Other mixers having different characteristics may also be used.

An LO reference signal for the mixer 56 is provided by a reference oscillator 58 such as, for example, a 301 MHz Oscillator, although other oscillators having different center frequencies may also be used. In one example, a maximum allowable frequency variation is determined to be approximately 150 Hz. For stability in this example, the reference oscillator 58 should have stability better than about 0.5 ppm. For example, a Temex QED 110 may be used having frequencies from about 0.4 MHz to about 110 MHz and providing a stability of about 0.2 ppm over a temperature range of −30 C to +75 C. To realize the exemplar 301 MHz frequency, the oscillator 58 can provide a 100.3 MHz signal to a 3× frequency multiplier.

The output of the mixer 56 is fed to a band pass filter 60 to remove all undesired signal and then fed into a power amplifier 62. A final RF analog filter 64 provides clean-up attenuation of D/A harmonics outside of the nominal transmit band. One exemplary application of the spread spectrum radio 14 of the present invention is with 25 kHz and 5 kHz satellite communication channels. In one embodiment, users of 25 KHz channels transmit a minimum effective isotropic radiated power (EIRP) of +18 dBW. A typical 25 KHz man-pack terminal has an antenna with about 5 to about 9 dBi antenna gain with corresponding minimum transmitter powers ranging from about 20 Watts to about 8 Watts of power amplifier. As previously mentioned, the power amplifier 62 can accommodate the aforementioned peak-to-average ratio of about 6 dB. In this embodiment employing the same 5 to 9 dBi antennas and accommodating the expected peak-to-average ratio, the power amplifiers transmit about 80 Watts to about 32 Watts. If the data rate is reduced, the transmitter EIRP is correspondingly reduced. Additionally, while a minimum size antenna is desirable, reducing the size of the antenna generally reduces the antenna gain. Power amplifier methods of the spread spectrum radio 14 can handle high peak-to-average ratios without having to generate a full average power 100% of the time. Adaptive bias amplifiers are amplifiers where a bias level can be adjusted externally to change a corresponding power rating. Adaptive bias amplifiers can also be used for the power amplifier 62 based on a determination by the up-converter 50 of when a high peak value condition exists and corresponding command to the amplifier to a new bias state.

At the down-converter 70, the full band, such as from the transponder 20, is first fed into a bandpass filter 72 to remove as much extraneous signal as practical and to reduce potential inter-modulation products that could cause interference within the spread spectrum radio 14. This signal is then passed through a low noise amplifier (LNA) 74. Removing extraneous signal generally minimizes a required dynamic range of the LNA 74. In one example, if the antenna gain is 0 dBi, then a noise temperature of the down-converter 70 should be less than 500 K, which is equivalent to a 4.3 dB noise figure given no excess ambient noise. Although upand-down conversion is discussed herein with regard to satellite communication bands, the spread spectrum radio 14 is not intended to be limited to such application and may be used with any of a variety of communication bands with corresponding modifications to filters, oscillators, and other frequency-based components and circuitry.

The output of the LNA 74 is fed into a pair of quadrature mixers, shown generally at 76, where the signal is converted to I&Q baseband signals. In one embodiment, a receive-oscillator 78 providing a frequency of about 259.5125 MHz is selected for the LO frequency because there are generally no desired signals within 860 kHz of this frequency. This allows AC coupling to be used in baseband circuitry. The receive-oscillator 78 may be operatively similar to the reference oscillator 58 used in the up-converter 50, except that the receive-oscillator operates at 259.5125 MHz. The mixers 76 in the down-converter 70 may also be operatively similar to the mixers 56 used in the up-converter 50.

The outputs of the mixers 76 are AC coupled to amplifiers 80 and fed through low pass filters 82 to remove undesired signals which also generally removes problems associated with DC imbalance of the mixers 86. The outputs of the filters 82 are then fed into analog-to-digital converters (ADCs) 84. 12-bit ADC's may be used in one embodiment, and the sampling rate of the ADCs is generally greater than twice the signal bandwidth, or 38 Msps in this embodiment. Many ADC types are suitable including, by way of example and not of limitation, model type Analog Devices part number AD9244-65. This device is a 14-bit ADC with a sample rate of 65 Msps and having a power dissipation typically about 600 mW.

Particular antenna implementation can be determined after an antenna gain is established. The T/R switch 46 may be included to time-share the antenna between the up-converter 50 and the down-converter 70. For example, a half-duplex system allows a switch to be used for this function. In a half-duplex system, the up-converter amplifier 62 can be switched off to simplify noise problems. In a full-duplex system, it may be necessary to add a band reject filter to the output of the transmit amplifier 62 to remove noise at the receive frequency.

Although direct I&Q up-conversion examples of RF architectures have been discussed hereinabove for conversion of digital data to an analog transmit signal, a low intermediate frequency (IF) with mixer up-conversion based architecture is also suitable in addition to other RF architectures. For example, an analog signal with 19 MHz bandwidth can be generated at a higher frequency, such as 70 MHz. To generate this signal, the DAC samples at a rate greater than twice the highest frequency, for example at a rate greater than approximately 160 Msps. DAC converters are available that can operate at this sample rate such as Analog Devices part number AD9775. The AD9775 is a 14-bit device that operates at 400 Msps and dissipates about 1.5 Watts. In this example, the output of the DAC should be filtered to remove replications of the signal that may occur at baseband or at other frequencies. If the analog signal is generated at a sufficiently high IF frequency, it is not necessary to use I&Q up-conversion techniques. Filtering can be used to reduce all undesired mixing products below a desired spur free dynamic range. A 12-bit converter can provide a 74 dB dynamic range with a corresponding change in the local oscillator frequency to accommodate a non-baseband input.

The receive signal may also be digitized at an IF frequency such as 70 MHz. In a manner similar to up-conversion, the ADC samples at a rate greater than twice the highest frequency, for example at a rate greater than approximately 160 Msps. ADC converters are available that operate at this sample rate such as Analog Devices part number AD9430-210. The AD9430-210 is a 12-bit device that operates at 200 Msps and dissipates about 1.3 Watts. In this example, anti-aliasing filters are used to provide 74 dB rejection at half the center IF frequency 35 MHz. Additionally in this example, a 70 MHz filter with a pass bandwidth of 20 MHz should have approximately 6 poles to provide this rejection at 35 MHz.

Figure 11:
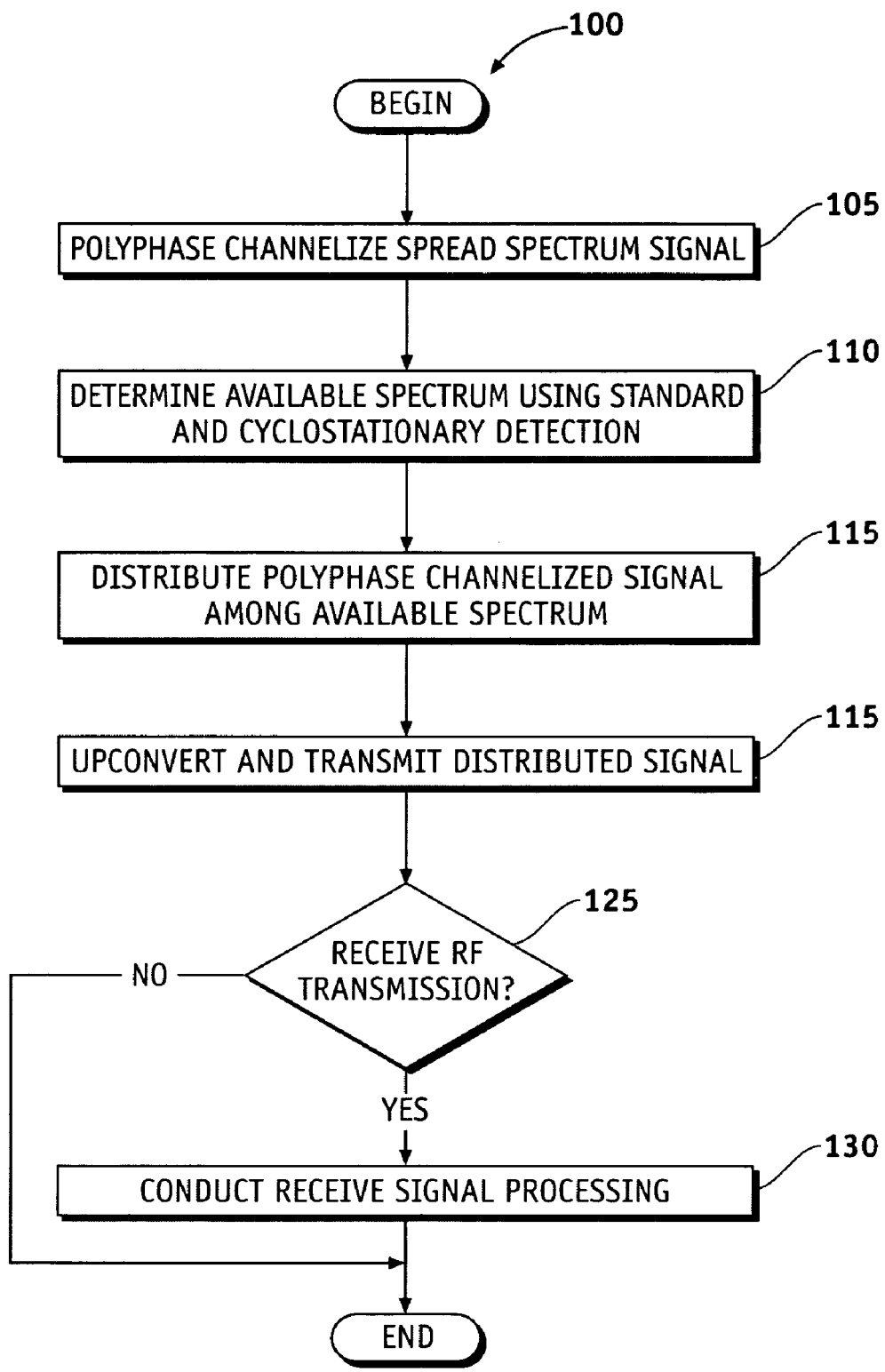
FIG. 11 is a flow chart showing a method of communication for a direct sequence spread spectrum signal.

FIG. 11 is a flowchart showing a method of communication for a direct sequence spread spectrum signal. The method begins at step 100. A DSSS-CDMA processor provides baseband data or voice packet coding and modulation coding. The bandwidth and chipping rate of the resulting spread signal are scaled to match the aggregate bandwidth of the total number of channels available within the observed frequency range.

The continuous spectrum of the spread signal is channelized by the transmit channel transformation processor 40 (FIG. 1) using a programmable and reversible polyphase channelization process at step 105. The available spectrum is determined, such as by the interference processor 34 (FIG. 1), using standard and cyclostationary detection of occupied bands and other spread users below the noise floor. Although determination of available spectrum 110 is shown in FIG. 11 as being subsequent to polyphase channelization 105, determination of available spectrum step 110 may be performed prior to polyphase channelization step. The channelizer's filter bandwidths are set so that a group of channelized filters can be fit within an available channel width.

The CDMA channelized filters are distributed among all of the available discontiguous portions of spectrum at step 115 in one embodiment. In this embodiment, after the CDMA spectrum is channelized, each of the channelizer filters are distributed into any available or usable spectrum, as determined by the cyclostationary detection process, and in any order so long as the order is restored on receive. Samples from each channelizer filter are digitally translated to a desired channel position. Based upon spectrum observations, a power level, or ratio, for each channel and choice of channels for CDMA operation are allocated.

Figure 12:
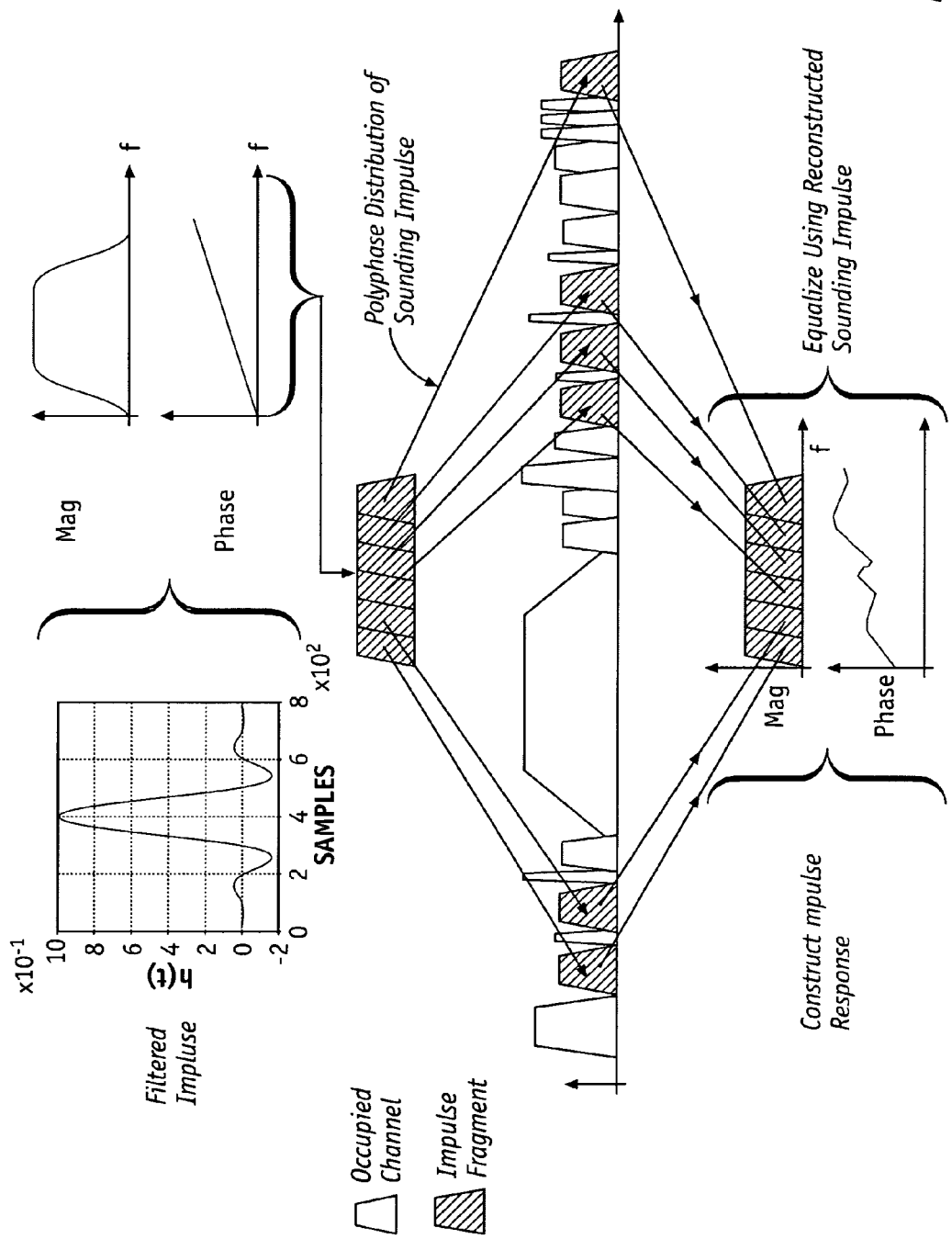
FIG. 12 is a schematic diagram illustrating discontiguous polyphase channel sounding.

FIG. 12 is a schematic diagram illustrating discontiguous polyphase channel sounding. The method can further include a discontiguous polyphase channel sounding to mitigate wide band dispersion effects, including magnitude distortion and phase distortion, over a chosen discontiguous distribution, as shown in FIG. 12. For example, a discontiguous filtered impulse having a known magnitude and phase may be polyphase channelized to produce impulse channels. The resulting impulse channels are then distributed according to an observed spectrum distribution to produce distributed impulse channels. The distributed channels are transmitted through a dispersive channel to produce a distorted discontiguous filtered impulse. Additionally, the distorted discontiguous filtered impulse may be received, and the impulse channels polyphase reconstructed to produce a distorted continuous filtered impulse. The channel may then be equalized using the distorted continuous filtered impulse.

The resulting conditioned CDMA signal is up-converted and transmitted at step 120. The up-converter 50 (FIGS. 1 and 10) interpolates, D/A converts, and analog filters the conditioned CDMA signal for up-conversion to a final RF transmit band. The digital spectrum provided to the D/A is digital filtered and sampled with an interpolated rate sufficient to assure the D/A harmonics within the analog filtered band from the individual channels are sufficiently attenuated.

A determination of whether reception of RF transmission is selected, such as may be selected in the half-duplex radio embodiment using the optional T/R switch or continuously or intermittently performed in the full-duplex radio embodiment, is performed by the spread spectrum radio 14 (FIG. 1) at step 125. If reception of RF transmission is selected, receive signal processing is conducted at step 130. If reception of RF transmission is not selected, the method ends.

Figure 13:
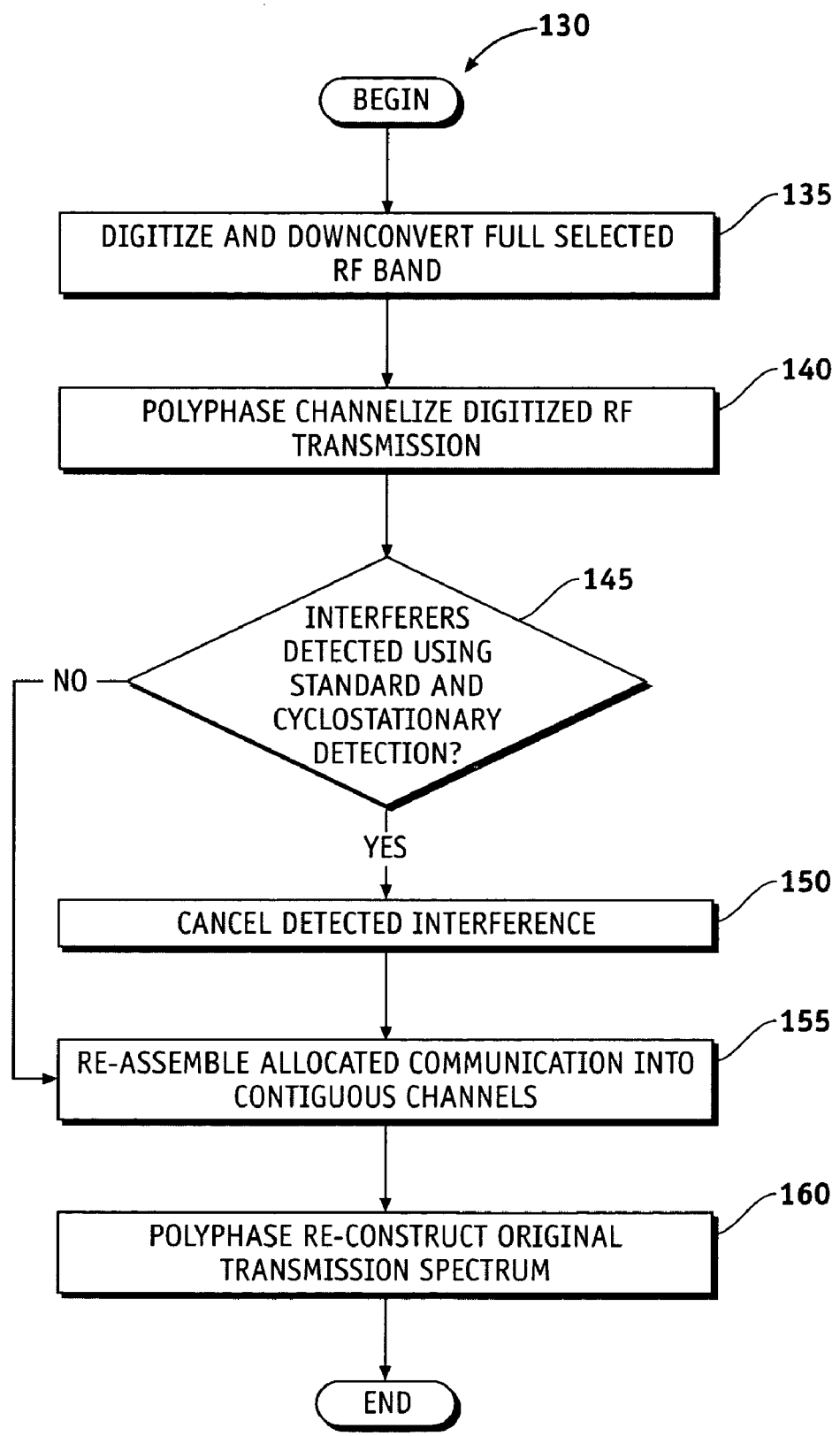
FIG. 13 is a flow chart showing receive signal processing.

FIG. 13 is a flowchart showing receive signal processing. In one embodiment, the full SATCOM spectrum is digitized and down-converted by the down-converter 70 at step 135. Analog RF low noise amplification, pre-selection, down-conversion, and A/D sampling functions are performed by the down-converter 70 (FIGS. 1 and 10). The fully digitized RF bandwidth provided by the RF down-converter is polyphase channelized at step 140. The receive channelizer uses digital filtering function similar to channelizing the original CDMA channel spectrum after sample rate interpolation. Extraneous spectral inputs from known gaps between channels may be zeroed as a part of a spectrum normalization process for mitigating interference. In one embodiment, the original CDMA spectrum can be reconstructed in a reverse order, compared to fabrication, using near-perfect reconstruction techniques familiar to those of skill in the art.

In one embodiment, interference detection is conducted by the interference processor 34 at step 145. If interference is detected, the interference is cancelled at step 150. If no interference is detected, the method proceeds to re-assembling the allocated communication at step 155 described in greater detail hereinbelow. In an alternative embodiment, the interference detection step 145 and cancellation step 150 may occur after the re-assembling step 155. Detection, demodulation, and interference mitigation of legacy signal interference or other intermittent sub-band interferers are conducted by the interference processor 34 (FIG. 1). The interference channel signal strength is measured to provide a signal power ratio feedback data to the CDMA transmitter. Doppler tracking and channel equalization are optionally performed depending on the type of interference cancellation techniques used.

As previously mentioned, a variety of interference mitigation methods are usable by the interference processor 34 (FIG. 1) including but not limited to: interference prediction with inverse filtering of the interference; spectral self-normalization to suppress interfering spectral peaks; adaptive weighting; and, decision directed feedback cancellation. In decision directed feedback cancellation, legacy signals within each channel are demodulated to identify and separate each signal, then re-modulated and inverse equalized out of phase with a stored receive signal to cancel them from the CDMA channel process. Cyclostationary feature detection is employed to extract interferer features prior to cancellation.

By applying non-linear signal processing at the input to the CDMA underlay receiver, interference created by other users are mitigated. CDMA channelized filters that were distributed over the various set of channels are re-assembled, or translated, to the same order of the CDMA signal after the polyphase channelization of the original continuous transmitter CDMA spectrum at step 155. In one embodiment, the original baseband CDMA spectrum is polyphase reconstructed at step 160 using near-perfect reconstruction techniques to allow for standardized CDMA processing.

Using DSSS assists in transmitting at power levels below surrounding legacy signal and interference with processing gain sufficient to provide a robust channel. The interference mitigation provided by cyclospectrum detection and subsequent cancellation as previously discussed hereinabove improves potential data rate per user and generally increases allowable number of users such as in multiple, simultaneous CDMA channel communication.

The polyphase channel transformation processes previously discussed hereinabove generally make the RF and allocated channel process transparent to the backend CDMA communication process. The CDMA process behind the polyphase transformation operates as if a conventional RF front end, such as a cellular telephone, were used although other embodiments are also available. In one embodiment, a normal contiguous RF interface is provided to the CDMA (or CDMA-like) process regardless of frequency allocation or dynamic changes to the channels allocations. In this embodiment, the present invention can be bootstrapped to a standard CDMA and networking process with associated COTS hardware at low cost, small size, low weight, and low power consumption at the backend. Additionally, digital polyphase channelization filtering has a capability for perfect waveform reconstruction, and the polyphase channel transformations take advantage of such processing efficiency.

The invented method and apparatus present significant benefits that would be apparent to one of ordinary skill in the art. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of communication comprising the steps of:
polyphase channelizing a signal;
determining available spectrum in an observed frequency range having a noise floor based on cyclostationary detection of polyphase users below the noise floor; and
distributing the polyphase channelized signal among discontiguous portions of the available spectrum.

2. A method of communication according to claim 1, wherein said signal is a direct sequence spread spectrum (DSSS) signal.

3. A method of communication according to claim 1, wherein said signal is a featureless waveform.

4. A method of communication according to claim 1, wherein said channelizing step comprises the step of determining a number of channelized filters based on the total number of channels; and wherein said distributing step comprises the step of distributing the channelized filters into available spectrum.

5. A method of communication according to claim 1 further comprising the steps of:
up-converting the distributed polyphase channelized signal; and
transmitting the up-converted signal.

6. A method of communication comprising the steps of:
polyphase channelizing a signal;
determining available spectrum in an observed frequency range having a noise floor based on detection of polyphase users below the noise floor by
   detecting at least one of occupied bands, interferers, and polyphase users in the observed frequency range using cyclostationary feature detection,
   determining a total number of channels available within the observed frequency range based on detected occupied bands, interferers, and polyphase users, and and
   determining an aggregate bandwidth based on the total number of channels available within the observed frequency range; and
distributing the polyphase channelized signal among the available spectrum.

7. A method of communication comprising the steps of:
polyphase channelizing a signal by determining a number of channelized filters based on the total number of channels; and wherein said distributing step comprises the step of distributing the channelized filters into available spectrum;
determining available spectrum in an observed frequency range having a noise floor based on detection of polyphase users below the noise floor; and
distributing the polyphase channelized signal among the available spectrum by
   applying discontiguous polyphase channel sounding to the observed frequency range, and
   mitigating wide band dispersion effects based on the channel sounding.

8. A method of communication according to claim 7, wherein said polyphase channel sounding step further comprises the steps of:
polyphase channelizing a discontiguous filtered impulse to produce impulse channels;
distributing the impulse channels according to an observed spectrum distribution to produce distributed impulse channels; and
transmitting the distributed impulse channels through a dispersive channel to produce a distorted discontiguous filtered impulse.

9. A method of communication according to claim 8, wherein said polyphase channel sounding step further comprises the steps of:
receiving the distorted discontiguous filtered impulse;
polyphase reconstructing the impulse channels to produce a distorted continuous filtered impulse; and
equalizing the channel using the distorted continuous filtered impulse.

10. A method of communication comprising the steps of:
polyphase channelizing a signal;
determining available spectrum in an observed frequency range having a noise floor based on detection of polyphase users below the noise floor; and
distributing the polyphase channelized signal among the available spectrum by allocating the polyphase channelized signal among non-contiguous available spectrum.

11. A method of communication comprising the steps of:
polyphase channelizing a signal;
determining available spectrum in an observed frequency range having a noise floor based on detection of polyphase users below the noise floor; and
distributing the polyphase channelized signal among the available spectrum;
up-converting the distributed polyphase channelized signal; and
transmitting the up-converted signal by transmitting a discontiguous spectrum access control signal.

12. A method of communication comprising the steps of:
polyphase channelizing a signal;
determining available spectrum in an observed frequency range having a noise floor based on detection of polyphase users below the noise floor;
distributing the polyphase channelized signal among the available spectrum;
down-converting an analog radio frequency (RF) transmission having discontiguous polyphase waveform distribution of an original DSSS signal; and
digitizing the down-converted RF transmission.

13. A method of communication according to claim 12 further comprising the steps of:
polyphase channelizing the digitized RF transmission; and
mitigating interference from at least one of legacy signal interference and sub-band interferers.

14. A method of communication according to claim 13 further comprising the steps of:
receiving the discontiguous spectrum access control signal; and
adapting said polyphase channelizing step based on the control signal.

15. A method of communication according to claim 13 further comprising the steps of:
autonomously determining a transmitter channel allocation; and
adapting said polyphase channelizing step based on the determined channel allocation.

16. A method of communication according to claim 13, wherein said mitigating step comprises one of predicting interference using transversal filters, suppressing interfering spectral peaks by magnitude normalizing in frequency domain, adaptive inverse weighting in frequency domain, and decision directed feedback canceling.

17. A method of communication according to claim 16, wherein said decision directed feedback canceling comprises:
extracting interferer features using cyclostationary feature detection; and
coherent canceling of interferers based on the extracted interferer features.

18. A method of communication according to claim 17 further comprising the steps of:
re-assembling the polyphase channelized transmission into contiguous channels after said mitigating step; and
polyphase reconstructing the original DSSS signal from the re-assembled transmission.

19. A method of communication according to claim 17 further comprising the steps of:
re-assembling the polyphase channelized transmission into contiguous channels after said digitized RF transmission polyphase channelizing step; and
polyphase reconstructing the original DSSS signal from the re-assembled transmission.

20. A method of communication according to claim 19, wherein said polyphase reconstructing step comprises preconditioning data in the reassembled transmission to produce near-perfect reconstruction of the original DSSS signal.

21. A method of communication according to claim 19, wherein said mitigating interference step follows said polyphase reconstructing step.

22. A spread spectrum radio comprising:
a signal processor configured to polyphase channelize a code division multiple access (CDMA) spectrum and a digitized RF bandwidth containing a discontiguous polyphase waveform distribution;
a signal detector configured to detect occupied bands, interferers and polyphase users in a spectrum and determine discontiguous frequency opportunities based on the detected interferers and polyphase users; and
a signal distributor configured to allocate the polyphase channelized CDMA spectrum among available spectrum based on the discontiguous frequency opportunities.

23. A method of communication according to claim 22 further comprising a control channel configured to produce spectrum access control signal.

24. A spread spectrum radio according to claim 22 further comprising an interference cancellation processor configured to perform one of interference prediction with inverse filtering of interference, spectral self-normalization to suppress interfering spectral peaks, adaptive inverse weighting in a frequency domain, and decision directed feedback cancellation.

25. A spread spectrum radio according to claim 22 further comprising:
a CDMA encoder configured to code and modulate a data packet or voice packet; and
a CDMA decoder configured to decode and demodulate a slotted CDMA signal.

26. A spread spectrum radio according to claim 22 further comprising:
an up-converter configured to convert the allocated spectrum from said signal distributor to a pre-determined frequency for transmission, said up-converter comprising:
at least one digital-to-analog converter (DAC);
at least one low pass filter connected to said at least one DAC; and
a balanced mixer connected to said at least one low pass filter; and
a down-converter configured to convert a full pre-determined bandwidth to a digitized RF bandwidth, said down-converter comprising:
a bandpass filter configured to removing extraneous signals;
a pair of quadrature mixers connected to said bandpass filter, said quadrature mixers configured to convert the filtered RF bandwidth to in-phase (I) and quadrature-phase (Q) baseband signals; and
at least one analog-to-digital converter (ADC) connected to said quadrature mixers.

27. A spread spectrum radio according to claim 26 further comprising:
an antenna; and
a transmit/receive switch configured to time-share said antenna between said up-converter and said down-converter.

28. A spread spectrum radio according to claim 22, wherein said signal processor comprises a processing unit adapted to perform a combination of standard and cyclostationary detection of non-occupied spectrum above and below a noise floor.

29. A spread spectrum radio according to claim 22, wherein said spread spectrum radio is a software programmable radio.

30. A spread spectrum radio according to claim 22, wherein said spread spectrum radio is a software defined radio.

31. A digital radio comprising:
a first processor configured to polyphase channelize a CDMA spectrum;
a second processor configured to determine available spectrum based on non-linear signal processing of an observed RF spectrum, said second processor detecting occupied bands, interferers, and polyphase users above and below a noise floor
a third processor configured to allocate the channelized spectrum from said first processor among the available spectrum;
a fourth processor configured to up-convert the allocated spectrum from said third processor to an RF transmit signal and down-convert RF received signals to digitized RF bandwidth; and
a fifth processor configured to polyphase channelize the digitized RF bandwidth from said fourth processor, cancel interference based on detected interferers from said second processor, and reconstruct an original CDMA spectrum.

32. A digital radio according to claim 31 further comprising:
a sixth processor configured to CDMA code and modulate packet data; and
a seventh processor configured to CDMA decode and demodulate the original CDMA spectrum from said fifth processor.

* * * * *